United States Patent
Schütz

(10) Patent No.: US 12,330,575 B2
(45) Date of Patent: Jun. 17, 2025

(54) AIRBAG MODULE ASSEMBLY, METHOD FOR PRODUCTION AND QUALITY TESTING THEREOF, AND VEHICLE STEERING WHEEL HAVING SUCH AN AIRBAG MODULE ASSEMBLY

(71) Applicant: ZF AUTOMOTIVE SAFETYGERMANY GMBH, Aschaffenburg (DE)

(72) Inventor: Dominik Schütz, Heimbuchenthal (DE)

(73) Assignee: ZF AUTOMOTIVE SAFETY GERMANY GMBH, Aschaffenburg (DE)

( * ) Notice: Subject to any disclaimer, the term of this patent is extended or adjusted under 35 U.S.C. 154(b) by 0 days.

(21) Appl. No.: 18/248,062

(22) PCT Filed: Sep. 29, 2021

(86) PCT No.: PCT/EP2021/076793
§ 371 (c)(1),
(2) Date: Apr. 6, 2023

(87) PCT Pub. No.: WO2022/073819
PCT Pub. Date: Apr. 14, 2022

(65) Prior Publication Data
US 2023/0382341 A1    Nov. 30, 2023

(30) Foreign Application Priority Data
Oct. 7, 2020  (DE) ................... 10 2020 126 207.8

(51) Int. Cl.
*B60R 21/203* (2006.01)
*B60Q 5/00* (2006.01)
(Continued)

(52) U.S. Cl.
CPC .......... *B60R 21/2037* (2013.01); *B60Q 5/003* (2013.01); *B60R 21/2176* (2013.01);
(Continued)

(58) Field of Classification Search
CPC ........ B60R 21/2037; B60R 2021/2175; B60Q 5/003; F16F 15/04
See application file for complete search history.

(56) References Cited

U.S. PATENT DOCUMENTS 5,971,429 A * 10/1999 Bramberger .......... B60R 21/203
280/731
6,062,592 A * 5/2000 Sakurai ............... B60R 21/2037
280/728.2
(Continued)

FOREIGN PATENT DOCUMENTS

DE        3710173 C2    10/1988
DE    202006016948 U1    3/2007
(Continued)

OTHER PUBLICATIONS

Sri Welaratna, "Vibration Testing in the Automotive Industry", Electronic Design (Mar. 1, 2000), https://www.electronicdesign.com/home/article/21200454/vibration-testing-in-the-automotive-industry (Year: 2000).*

(Continued)

*Primary Examiner* — Paul N Dickson
*Assistant Examiner* — Tiffany L Webb
(74) *Attorney, Agent, or Firm* — Tarolli, Sundheim, Covell & Tummino LLP

(57) ABSTRACT

The invention relates to an airbag module assembly (14) for mounting on a steering wheel main part (12), having a driver's airbag module (16) which comprises a folded airbag (18), a gas generator (20) for inflating the folded airbag (18) and a module housing (22) for receiving the gas generator
(Continued)

(20) and the folded airbag (18), and a vibration absorber unit (24) which comprises a steering wheel mounting plate (26) for fastening the airbag module assembly (14) on the steering wheel main part (12) and at least one resilient damping element (28), wherein the driver's airbag module (16) is screw-connected, riveted or welded to the steering wheel mounting plate (26) via the at least one resilient damping element (28) in a manner capable of vibrating. The invention furthermore also relates to a vehicle steering wheel (10) having such an airbag module assembly (14) and to a method for producing and quality-testing such an airbag module assembly (14).

16 Claims, 4 Drawing Sheets

(51) Int. Cl.
*B60R 21/217* (2011.01)
*B60R 21/237* (2006.01)
*F16F 15/04* (2006.01)
*G01M 7/02* (2006.01)

(52) U.S. Cl.
CPC ............ *B60R 21/237* (2013.01); *F16F 15/04* (2013.01); *B60R 2021/2175* (2013.01); *F16F 2230/0005* (2013.01); *G01M 7/02* (2013.01)

(56) References Cited

U.S. PATENT DOCUMENTS

| | | | | |
|---|---|---|---|---|
| 6,592,141 | B1* | 7/2003 | Dancasius | B60R 21/2037 280/728.1 |
| 7,052,035 | B2* | 5/2006 | Kreuzer | B60R 21/2037 200/61.55 |
| 7,694,997 | B2* | 4/2010 | Burghardt | B60R 21/2037 280/743.1 |
| 8,201,847 | B2* | 6/2012 | Hondier | B60R 21/21656 200/61.55 |
| 8,286,766 | B2* | 10/2012 | Terada | B62D 7/222 200/61.55 |
| 8,720,942 | B2* | 5/2014 | Onohara | B60R 21/2037 74/552 |
| 8,733,203 | B2* | 5/2014 | Kondo | B60Q 5/003 74/552 |
| 9,403,552 | B2* | 8/2016 | Onohara | B62D 1/046 |
| 11,161,472 | B2* | 11/2021 | Schütz | B60Q 5/003 |
| 11,180,192 | B2* | 11/2021 | Bachmann | B60R 21/2035 |
| 11,414,038 | B2* | 8/2022 | Schmeier | B60R 21/21658 |
| 11,447,177 | B2* | 9/2022 | Myklebust | F16F 7/108 |
| 11,618,501 | B2* | 4/2023 | Shiraishi | B60R 21/26 74/552 |
| 11,718,257 | B2* | 8/2023 | McMillan | B60R 21/2037 280/731 |
| 11,987,308 | B2* | 5/2024 | Myklebust | B62D 7/222 |
| 2006/0028002 | A1* | 2/2006 | Tsujimoto | B60Q 5/003 280/731 |
| 2011/0120558 | A1 | 5/2011 | Facchetti et al. | |
| 2019/0217800 | A1* | 7/2019 | McMillan | B62D 1/11 |

FOREIGN PATENT DOCUMENTS

| | | |
|---|---|---|
| DE | 19858691 A1 | 1/2010 |
| DE | 102008064581 A1 | 6/2010 |
| DE | 102019104158 A1 | 4/2020 |
| WO | 2018/108335 A1 | 6/2018 |
| WO | 2019/183167 A1 | 9/2019 |

OTHER PUBLICATIONS

PCT International Search Report for corresponding International Application Serial No. PCT/EP2021/076793, mailed Dec. 3, 2021, pp. 1-4.

* cited by examiner

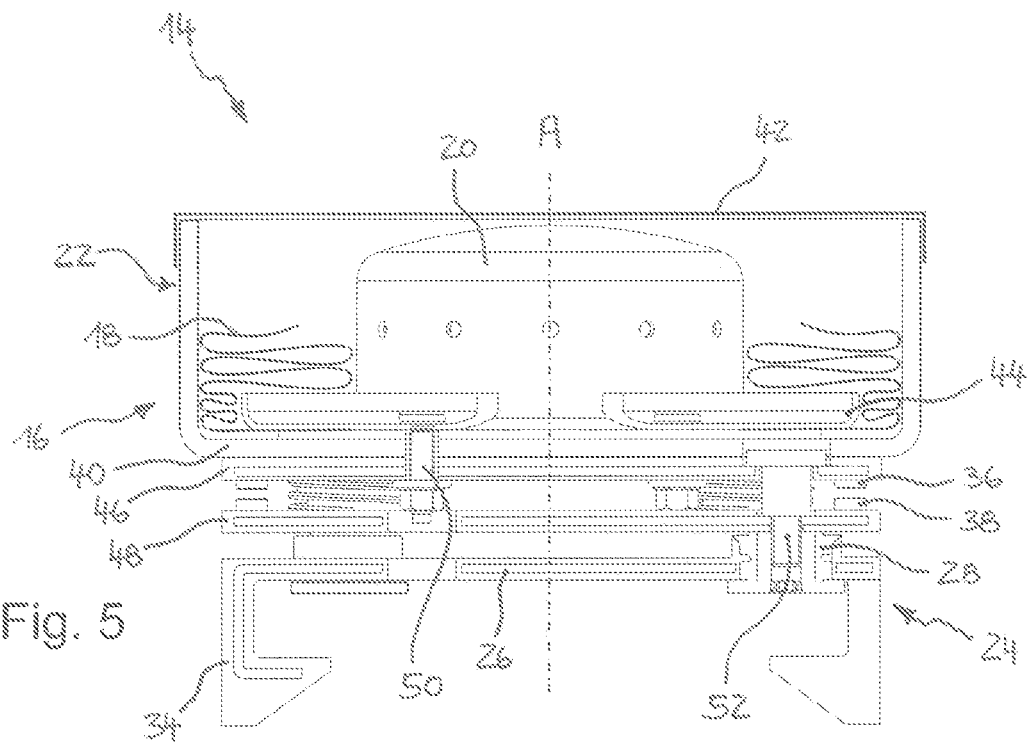

AIRBAG MODULE ASSEMBLY, METHOD FOR PRODUCTION AND QUALITY TESTING THEREOF, AND VEHICLE STEERING WHEEL HAVING SUCH AN AIRBAG MODULE ASSEMBLY

RELATED APPLICATIONS

This application is a U.S. National Stage Application filed under 35 USC 371, claiming priority to Serial No. PCT/EP2021/076793, filed on 29 Sep. 2021; which claims priority from German Patent Application DE 10 2020 126 207.8, filed 7 Oct. 2020, the entireties of which are hereby incorporated herein by reference.

TECHNICAL FIELD

The invention relates to an airbag module assembly for mounting on a steering wheel main part, having a driver's airbag module which comprises a folded airbag, a gas generator for inflating the folded airbag and a module housing for receiving the gas generator and the folded airbag, and having a vibration absorber unit which comprises a steering wheel mounting plate for fastening the airbag module assembly on the steering wheel main part as well as at least one resilient damping element. Moreover, the invention also relates to a method for production and quality-testing of such an airbag module assembly as well as to a vehicle steering wheel comprising such an airbag module assembly.

BACKGROUND

In many vehicle steering wheels, vibrations occur when idling or in particular speed ranges of the vehicle, which are experienced as annoying by the driver. Said vibrations are due, inter alia, to the rigid coupling of the steering wheel to the steering column.

It is known to use so-called vibration absorbers to avoid the undesired steering wheel vibrations in order to adjust the natural frequency of the overall system such that it is within an uncritical range. Currently, for example the gas generator of an airbag module disposed in the steering wheel is used as counter-vibrating absorber mass.

Since the vibration absorption is improving with an increasing absorber mass, DE 37 10 173 C2 already describes a vehicle steering system in which the whole airbag module is advantageously utilized as absorber mass. Via the shear stiffness of the vibration dampers used, the first natural frequency of the steering wheel/module system can be adjusted to be so low that it comes to be within a speed range of the vehicle in which high excitation amplitudes do not yet occur (such as at about 120 km/h).

In airbag modules that are capable of vibrating, currently the vibration absorbers are also utilized to implement a horn function on the vehicle steering wheel, with a horn contact being provided on the airbag module and a corresponding counter-contact being provided on the steering wheel main part. Such vehicle steering wheel is disclosed, for example, in U.S. Pat. No. 8,720,942 B2.

It has shown, however, that in those steering wheels, especially on rough roads, false triggering of the vehicle horn occurs or, as compared to steering wheels having no vibration absorption, larger contacting distances or higher contacting forces are required to trigger the vehicle horn. This results in undesirably large clearances on the vehicle steering wheel and impaired comfort when actuating the vehicle horn.

For this reason, in the generic WO 2018/108335 A1 it was already provided to carry out, with respect to the fastening member of a vibration absorber unit, the vibration absorption (in particular transversely to the steering wheel axis) on the side of the steering wheel main part, whereas a horn function (in the direction of the steering wheel axis) is realized on the module side. In this way, the horn function and the vibration absorbing function are separated from each other in a simple way so that vibration excitations of the steering column and the steering wheel main part tightly connected thereto (e.g., on rough road stretches) are initially damped between the steering wheel main part and the vibration absorber unit and do no longer directly affect the module-side horn function.

In WO 2018/108335 A1, the vibration absorber unit is preassembled specifically on the steering wheel main part, the airbag module being subsequently fastened to the steering wheel main part via latching with the vibration absorber unit. The vibration absorbing function thus cannot be checked before the vehicle steering wheel has been assembled, which has turned out as a drawback in respect of quality control. This is especially applicable when the driver's airbag module and the steering wheel main part are manufactured in different plants or are even supplied by different companies. A possibly given quality problem in connection with the vibration absorbing function in this case requires at first a failure identification and clarification of the responsibilities, a return of the defective component, a trouble-shooting as well as finally repeated supply of the (now faultless) steering wheel components, which is tedious, complicated and expensive on the whole.

SUMMARY

It is the object of the invention to provide a vehicle steering wheel of simple structure having a vibration absorber, wherein the vibration absorbing function can be checked as early as possible with little effort, in particular wherein in the vehicle steering wheel a horn function is integrated which, while showing high functional safety, has an as small actuating path as possible and an as low actuating force as possible.

In accordance with the invention, this object is achieved by an airbag module assembly of the above-specified type in which the driver's airbag module is screw-connected, riveted or welded to the steering wheel mounting plate via the at least one resilient damping element in a manner capable of vibrating. The vibration absorber unit is thus preassembled on the driver's airbag module and, together with the driver's airbag module forms the airbag module assembly. The vibration absorbing function thus can be tested independently of the steering wheel main part, for example by exciting the steering wheel mounting plate by at least one defined vibration and measuring the corresponding reaction of the vibration system and comparing it to target values.

A screw-connection, riveting or welding capable of vibrating of the driver's airbag module to the steering wheel mounting plate by a damping element in this context is to be understood such that the damping element allows for damped vibration between the driver's airbag module and the steering wheel mounting plate at least transversely to a steering wheel axis of the vehicle steering wheel, preferably also in the direction of the steering wheel axis. The maximum amplitude of a possible vibration in the direction of the steering wheel axis is particularly smaller than an axial actuating path for triggering a vehicle horn.

Components with a comparably high degree of damping which are also specifically utilized for vibration damping (for example elastomers) are referred to as "resilient damping elements". Accordingly, components which have a rather negligible damping and are not utilized for vibration damping (for example coil springs made of steel to reset a vehicle horn) are no resilient damping elements in accordance with the present application.

The screw-connection capable of vibrating of the driver's airbag module to the steering wheel mounting plate comprises at least one screwed connection (capable of vibrating) and optionally further screwed connections ("connected in series"), in particular a further rigid screwed connection.

Preferably, the airbag module assembly comprises at least one first horn contact and at least one second horn contact, the horn contacts being movable relative to each other between a home position in which the first and second horn contacts are spaced apart from each other and an actuating position in which the first and second horn contacts contact each other to trigger a horn signal. With respect to the at least one damping element, all of the horn contacts required to actuate the vehicle horn are provided on the module side, particularly preferred are even integrated in the driver's airbag module. Therefore, on the side of the steering wheel main part no horn contact is provided so that the horn function and the vibration absorbing function of the vehicle steering wheel are separated from each other in a simple manner. Vibration excitations of the steering column and the steering wheel main part tightly connected thereto (for example on rough road stretches) are damped initially on the steering wheel main part side and, consequently, do no longer directly affect the module-side horn function.

According to one embodiment of the airbag module assembly, the module housing includes a housing bottom adjacent to the steering wheel mounting plate of the vibration absorber unit as well as an opposite housing cap, wherein a screw is provided which screw-connects the housing bottom in a manner capable of vibrating to the steering wheel mounting plate via the at least one resilient damping element. Thus, the vibration absorber unit can be preassembled on the airbag module with minimum effort so that a prefabricated airbag module assembly is formed in which checking of the vibration absorbing function is possible already without a steering wheel main part.

In this case, the screw can additionally extend through an airbag retaining element disposed in the module housing so that the airbag is clamped between the airbag retaining element and the housing bottom by means of the screw-connection. In conventional airbag modules, too, it was common to fix an airbag mouth by clamping between an airbag retaining element and the housing bottom. The screw used for this purpose now is advantageously utilized at the same time for fastening the steering wheel mounting plate on the housing bottom in a manner capable of vibrating. As a consequence, the screws already previously used are merely adapted to the changed requirements; additional screws are not necessary.

Furthermore, in this case, for actuating a vehicle horn the housing cap and the housing bottom can be movable relative to each other to a limited extent between a home position in which a first horn contact and a second horn contact are spaced apart from each other, and an actuating position in which the two horn contacts contact each other, in particular wherein the first horn contact is coupled to the housing cap and the second horn contact is coupled to the housing bottom. Thus, all horn contacts of the vehicle horn are advantageously provided on module components supported to be vibrating.

With respect to the driver's airbag module, the vibration is thus absorbed (specifically transversely to the steering wheel axis) on the side of the steering wheel main part, whereas the horn contacts for triggering the vehicle horn (in the direction of the steering wheel axis) are integrated in the driver's airbag module. Thus, the horn function and the vibration absorbing function are separated from each other in a simple manner so that vibration excitations of the steering column and of the steering wheel main part tightly connected thereto (for example on rough road stretches) are damped at first between the steering wheel main part and the driver's airbag module and do no longer affect directly the horn function.

According to another embodiment of the airbag module assembly, the vibration absorber unit includes a module mounting plate which extends substantially in parallel to the steering wheel mounting plate and is screw-connected to the steering wheel mounting plate via the at least one resilient damping element in a manner capable of vibrating.

In this embodiment, for actuating a vehicle horn the module housing and the module mounting plate can be movable relative to each other to a limited extent between a home position in which a first horn contact and a second horn contact are spaced apart from each other and an actuating position in which the two horn contacts contact each other, in particular wherein the first horn contact is coupled to the module housing and the second horn contact is coupled to the module mounting plate. In case that the horn function is not to be integrated in the airbag module, this constitutes a simple option to implement the horn function between the driver's airbag module (supported to be vibrating) and the module mounting plate (also supported to be vibrating).

As an alternative, in this embodiment, the vibration absorber unit may additionally have an intermediate plate which extends substantially in parallel to the steering wheel mounting plate as well as between the module mounting plate and the steering wheel mounting plate, the steering wheel mounting plate being screw-connected by means of a first screw substantially without play and in a non-displaceable manner to the driver's airbag module and by means of a second screw, specifically a collar screw, to the steering wheel mounting plate via the at least one resilient damping element in a manner capable of vibrating. This configuration variant offers the advantage that the vibration damper unit (with integrated horn function) can be prefabricated as a robust separate structural unit, can be easily transported, where necessary, and then can be easily mounted on the airbag module via the first screw to form the airbag module assembly.

Preferably, the module mounting plate and the intermediate plate are movable relative to each other to a limited extent between a home position in which a first horn contact and a second horn contact are spaced apart from each other and an actuating position in which the two horn contacts contact each other, specifically wherein the first horn contact is coupled to the intermediate plate and the second horn contact is coupled to the module mounting plate. In this way, the horn function is implemented between the module mounting plate (supported to be vibrating) and the intermediate plate (also supported to be vibrating).

In accordance with the invention, incidentally the given object is also achieved by a vehicle steering wheel having a steering wheel main part and an afore-described airbag module assembly, the steering wheel mounting plate of the vibration absorber unit being fastened on the steering wheel main part substantially without play and in a non-displaceable manner.

Preferably, the steering wheel mounting plate forms a latching connection with the steering wheel main part, in particular with a steering wheel skeleton of the steering wheel main part. This allows advantageously for a particularly simple, quick and reliable mounting of the airbag module assembly on the steering wheel main part. In general, however, also a screwed or riveted connection is imaginable, of course.

Finally, the invention further relates to a method for production and quality testing of the above-described airbag module assembly comprising the following method steps of:
a) producing an airbag module assembly with a vibration absorbing function by connecting, specifically screw-connecting, a driver's airbag module to a vibration absorber unit; and then
b) testing the vibration absorbing function, specifically by measuring a system reaction after vibration excitation of the steering wheel mounting plate, before the airbag module assembly is mounted on a steering wheel main part.

As a result, a quality control of the vibration absorbing function can be advantageously carried out in the module factory already. Possible deviations from predetermined absorbing requirements can be detected even prior to delivery and can be eliminated on the spot. Should there arise any problems regarding the vibration absorption of the vehicle steering wheel later in the steering wheel or vehicle factory, a module supplier further can prove that the airbag module assembly has left their factory with perfect vibration absorbing function.

According to a method variant, in step b) moreover a horn function and optionally further functions of the airbag module assembly ( ) can be checked.

BRIEF DESCRIPTION OF THE DRAWINGS

Further features and advantages of the invention will be resulting from the following description of preferred embodiments with reference to the drawings, wherein:

FIG. 5 shows a schematic section across an airbag module assembly according to the invention as set forth in another embodiment in a home position of the integrated vehicle horn;

FIG. 6 shows a schematic section across the airbag module assembly according to FIG. 5 in an actuating position of the integrated vehicle horn;

DESCRIPTION

Figure 1:
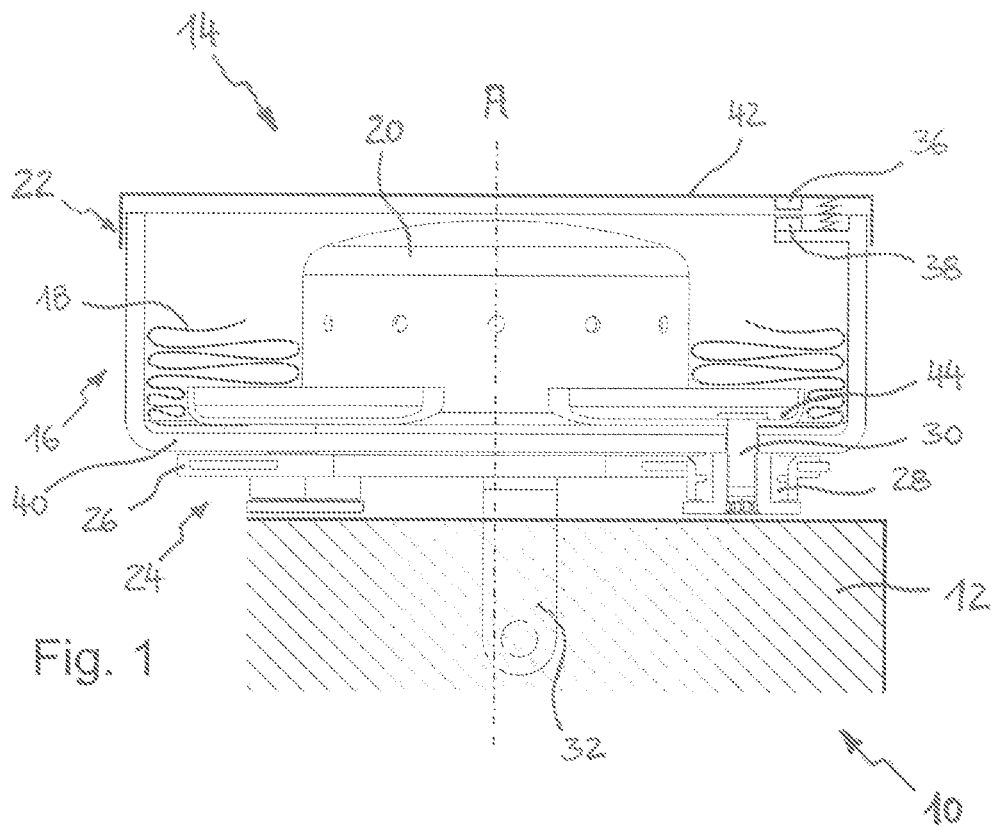
FIG. 1 shows a schematic section across a vehicle steering wheel according to the invention comprising an airbag module assembly according to the invention as set forth in one embodiment.
Figure 2:
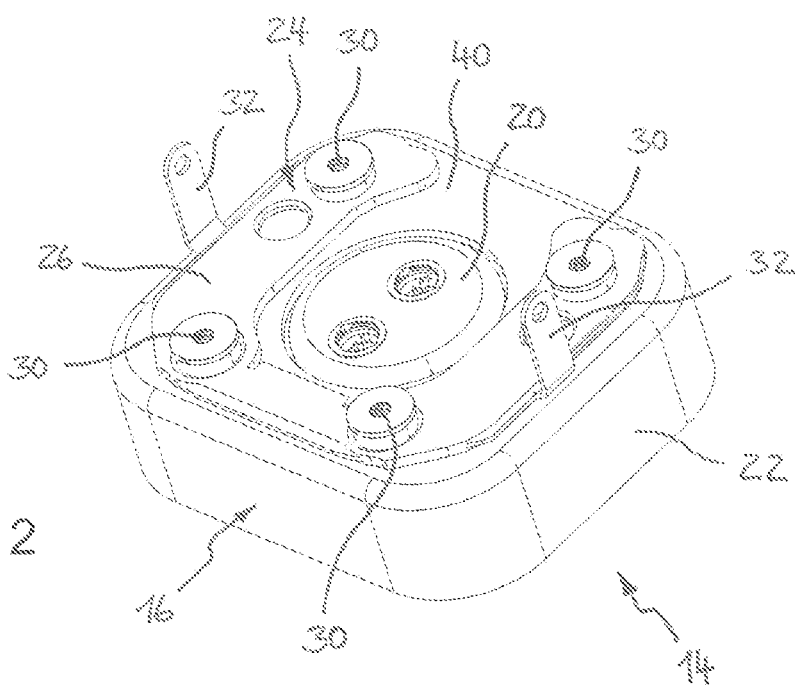
FIG. 2 shows a perspective bottom view of the airbag module assembly according to FIG. 1.

FIG. 1 illustrates a vehicle steering wheel 10 rotatable about a steering wheel axis A comprising a schematically indicated steering wheel main part 12 and an airbag module assembly 14 which is shown in FIG. 2 in a perspective bottom view.

The airbag module assembly 14 for mounting on the steering wheel main part 12 (see also FIG. 3) has, on the one hand, a driver's airbag module 16 which comprises a folded airbag 18, a gas generator 20 for inflating the folded airbag 18 and a module housing 22 for receiving the gas generator 20 and the folded airbag 18, and, on the other hand, a vibration absorber unit 24 which comprises a steering wheel mounting plate 26 for fastening the airbag module assembly 14 on the steering wheel main part 12 as well as at least one resilient damping element 28, wherein the driver's airbag module 16 is screw-connected to the steering wheel mounting plate 26 via the at least one resilient damping element 28 in a manner capable of vibrating. Although a screwed connection is particularly advantageous as regards the ease of installation, the tight connection and the costs, alternatively the driver's airbag module 16 can also be riveted or welded to the steering wheel mounting plate 26 via the at least one resilient damping element 28 in a manner capable of vibrating.

A screw connection capable of vibrating of the driver's airbag module 16 to the steering wheel mounting plate 26 is made, according to FIGS. 1 and 2, by four screw connections (capable of vibrating) "connected in parallel" each having one screw 30. Optionally, the screw connection of the driver's airbag module 16 to the steering wheel mounting plate 26 can comprise even further screw connections "connected in series", as is evident from the embodiment according to FIGS. 5 and 6.

For mounting the airbag module assembly 14 on the steering wheel main part 12, the steering wheel mounting plate 26 of the vibration absorber unit 24 is fastened on the steering wheel main part 12 substantially without play and in a non-displaceable manner.

Figure 3:
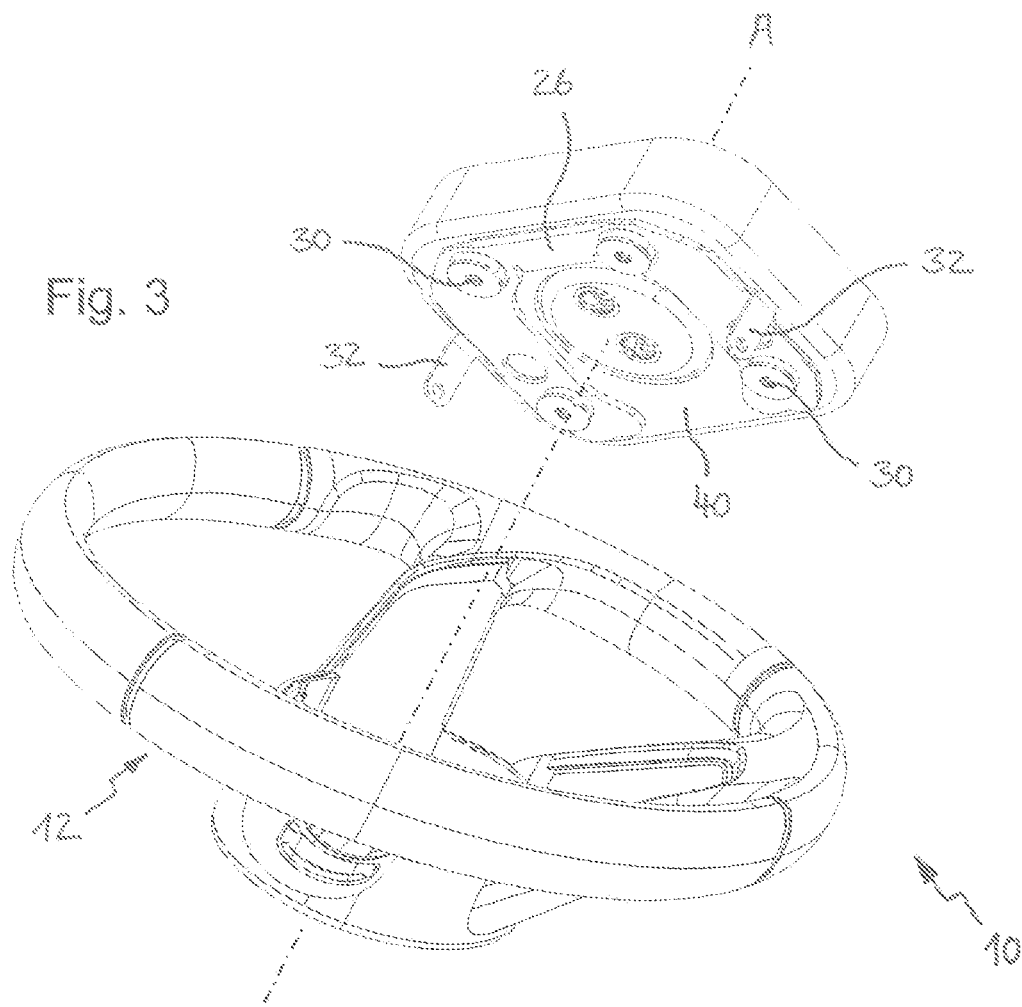
FIG. 3 shows a perspective exploded view of the vehicle steering wheel according to FIG. 1.

For this purpose, in the example configuration according to FIGS. 1 to 3, mounting tabs 32 for tight screw-connection to the steering wheel main part 12, specifically to a steering wheel skeleton of the steering wheel main part 12, are integrally formed with the steering wheel mounting plate 26.

Figure 4:
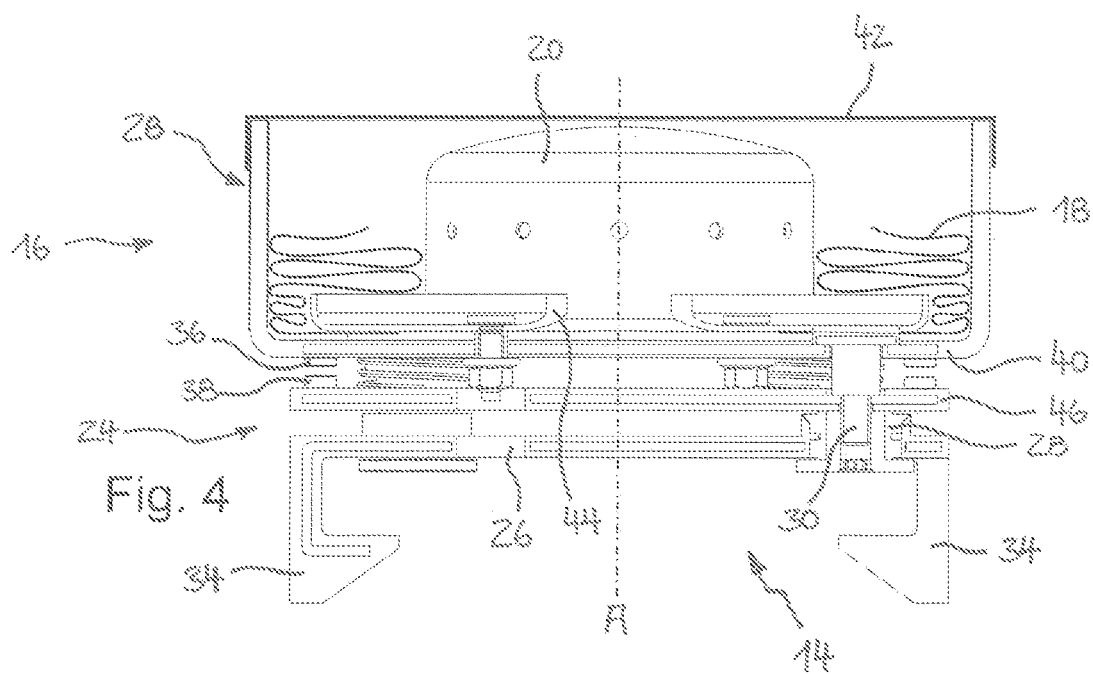
FIG. 4 shows a schematic section across an airbag module assembly according to the invention as set forth in another embodiment.

In order to allow for even simpler and quicker mounting of the airbag module assembly 14 on the steering wheel main part 12, the steering wheel mounting plate 26 can include, instead of the mounting tabs 32, also latch elements 34 for latching with the steering wheel main part 12, specifically with the steering wheel skeleton of the steering wheel main part 12, as indicated in the embodiments according to FIGS. 4 to 6. Then the airbag module assembly 14 is simply axially attached onto the steering wheel main part 12 during mounting and is finally fastened to the steering wheel main part 12 by one or more latching connections.

In general, the airbag module assembly in all illustrated embodiments includes at least one first horn contact 36 and at least one second horn contact 38, the horn contacts 36, 38 being movable relative to each other to a limited extent between a home position (see FIGS. 1, 4, 5 and 7) in which the first and second horn contacts 36 and 38 are spaced apart from each other, and an actuating position (see FIGS. 6 and 8) in which the first and second horn contacts 36, 38 contact each other to trigger a horn signal.

The module housing 22 of the driver's airbag module 16 includes a housing bottom 40 adjacent to the steering wheel mounting plate 26 of the vibration absorber unit 24 and an opposite housing cap 42, wherein four screws 30 are provided by means of which the housing bottom 40 is screw-connected to the steering wheel mounting plate 26 via the at least one resilient damping element 28 in a manner capable of vibrating.

FIG. 1 illustrates a section of one of the screwed connections and illustrates that the screw 30 additionally extends through an airbag retaining element 44 disposed in the module housing 22 so that the airbag 18 is clamped between the airbag retaining element 44 and the housing bottom 40 by means of the screw-connection.

In the embodiment of the airbag module assembly 14 according to FIGS. 1 to 3, for actuating a vehicle horn, the housing cap 42 and the housing bottom 40 are movable in the axial direction relative to each other to a limited extent between a home position in which the first horn contact 36 and the second horn contact 38 are spaced apart from each other and an actuating position in which the two horn contacts 36, 38 contact each other. In particular, the first horn contact 36 in this example configuration is disposed on the housing cap 42 and the second horn contact 38 is disposed on the housing bottom 40.

FIG. 4 shows another embodiment of the airbag module assembly 14 in which the vibration absorber unit 24 additionally comprises a module mounting plate 46 which extends substantially in parallel to the steering wheel mounting plate 26 and is screw-connected to the steering wheel mounting plate 26 via the at least one resilient damping element 28 in a manner capable of vibrating.

In this embodiment, for actuating a vehicle horn, the module housing 22 and the module mounting plate 46 are movable in the axial direction relative to each other to a limited extent between a home position shown in FIG. 4 in which the first horn contact 36 and the second horn contact 38 are spaced apart from each other and an actuating position in which the two horn contacts 36, 38 contact each other. In particular, the first horn contact 36 in this example configuration is disposed on the module housing 22 and the second horn contact 38 is disposed on the module mounting plate 46. Transversely to the horn actuating direction or steering wheel axis A, the module housing 22 and the module mounting plate 46 are connected largely without play and in any case in a manner not capable of vibrating.

FIGS. 5 and 6 illustrate another embodiment of the airbag module assembly 14 in which, based on the embodiment according to FIG. 4, the vibration absorber unit 24 additionally comprises an intermediate plate 48 which extends substantially in parallel to the steering wheel mounting plate 26 as well as between the module mounting plate 46 and the steering wheel mounting plate 26. The steering wheel mounting plate 26 is screw-connected, by means of a first screw 50, to the driver's airbag module 16 substantially without play and in a non-displaceable manner and, by means of a second screw 52, to the steering wheel mounting plate 26 via the at least one resilient damping element 28 in a manner capable of vibrating. The second screw 52 is specifically configured as a collar screw.

In this embodiment, for actuating a vehicle horn, the module mounting plate 46 and the intermediate plate 48 are movable in the axial direction relative to each other to a limited extent between a home position shown in FIG. 5 in which the first horn contact 36 and the second horn contact 38 are spaced apart from each other and an actuating position shown in FIG. 6 in which the two horn contacts 36, 38 contact each other. In particular, the first horn contact 36 in this example configuration is coupled to the intermediate plate 48 and the second horn contact 38 is coupled to the module mounting plate 46. Transversely to the horn actuating direction or steering wheel axis A, the module housing 22 and the module mounting plate 46 are connected largely without play and in any case in a manner not capable of vibrating.

Figure 7:
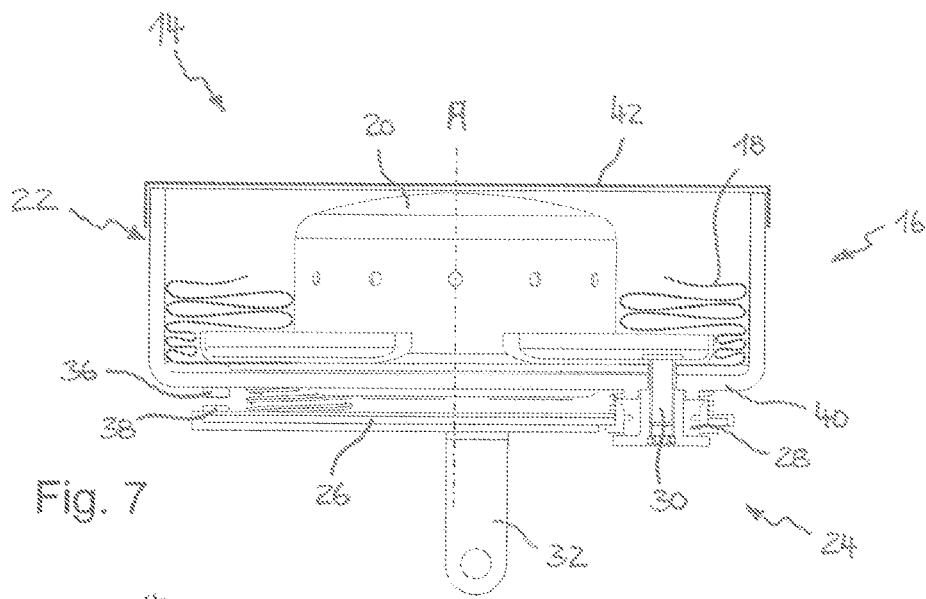
FIG. 7 shows a schematic section across an airbag module assembly according to the invention as set forth in another embodiment in a home position of the integrated vehicle horn.
Figure 8:
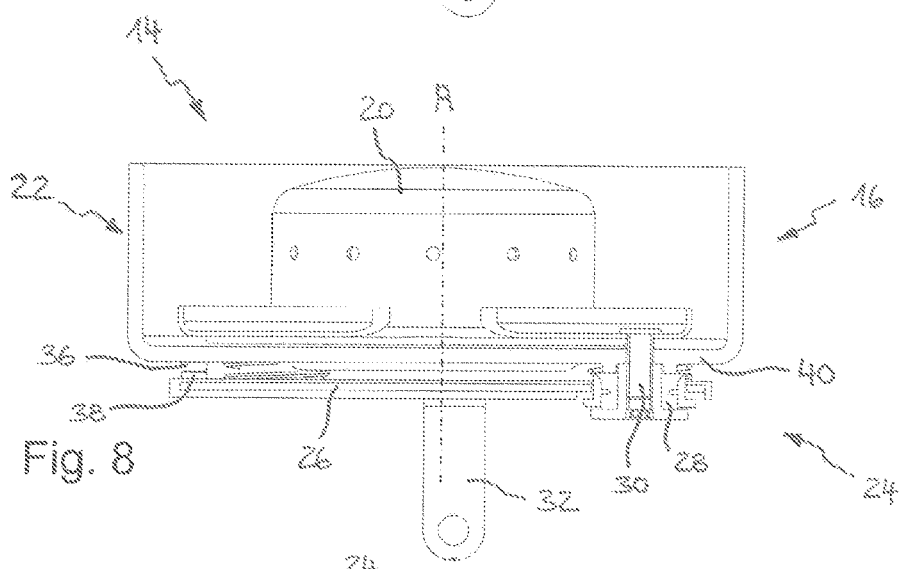
FIG. 8 shows a schematic section across the airbag module assembly according to FIG. 7 in an actuating position of the integrated vehicle horn.
Figure 9:
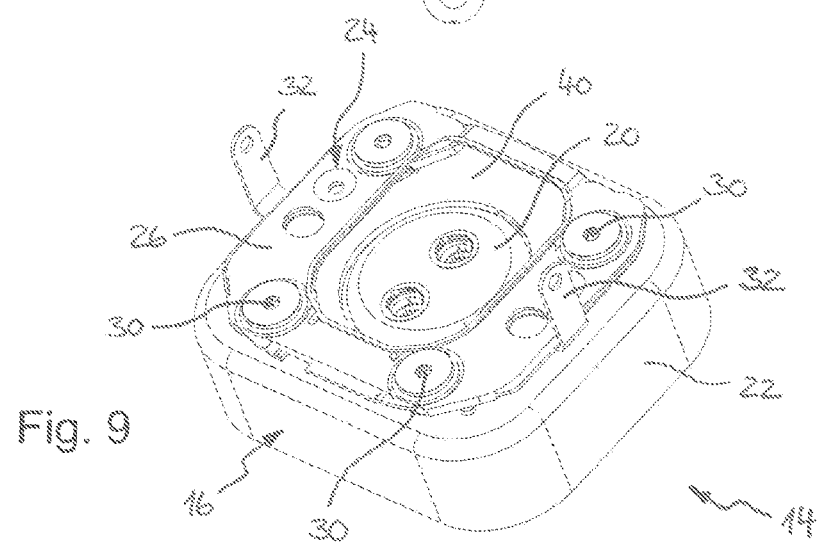
FIG. 9 shows a perspective bottom view of the airbag module assembly according to FIG. 7.

Finally, FIGS. 7 to 9 illustrate another embodiment of the airbag module assembly 14 which differs from the airbag module assembly 14 according to FIGS. 1 to 3 merely in that the vehicle horn is not triggered by a relative movement of the housing cap 42 and the housing bottom 40, but by a relative movement of the module housing 22 and the steering wheel mounting plate 26.

In particular, the first horn contact 36 in this example configuration is provided on the module housing 22 and the second horn contact 38 is provided on the steering wheel mounting plate 26. This embodiment shows the drawback that, although the first horn contact 36 is disposed on the module housing 22 supported in a vibrating manner, the second horn contact 38 is disposed on the steering wheel mounting plate 26, however, which is not supported in a vibrating manner but is tightly connected to the steering wheel main part 12. As a consequence, the horn function and the vibration absorbing function are no longer separated from each other in this case, which may result, as explained in the introductory part of the description, in larger clearances and/or impaired comfort when actuating the horn.

The structural design of all embodiments enables a particularly advantageous method for production and quality-testing of the airbag module assembly 14 comprising the following method steps of:

producing the airbag module assembly 14 with vibration absorbing function by connecting, specifically screw-connecting, the driver's airbag module 16 to the vibration absorber unit 24, and subsequently testing the vibration absorbing function, specifically by measuring a system reaction after vibration excitation of the steering wheel mounting plate 26, prior to mounting the airbag module assembly 14 on a steering wheel main part 12.

Accordingly, in step b) moreover also a horn function and, optionally, further functions of the airbag module assembly 14, such as a lighting function, can be checked.

The invention claimed is:

1. An airbag module assembly for mounting on a steering wheel main part, comprising:
   a driver's airbag module comprising a folded airbag, a gas generator for inflating the folded airbag and a module housing for receiving the gas generator and the folded airbag;
   a steering wheel mounting plate configured to be mounted rigidly to the steering wheel main part; and
   a vibration absorber unit configured to support the driver's airbag module on the steering wheel mounting plate,
   wherein the module housing is positioned over the steering wheel mounting plate and is secured to the steering wheel mounting plate via the vibration absorber unit, and
   wherein the vibration absorber unit comprises a connector and a resilient damping element through which the connector extends, the connector being connected to structure that supports the housing of the driver's airbag module substantially without play and in a non-displaceable manner;

the resilient damping element extending through the steering wheel mounting plate and receiving a portion of the steering wheel mounting plate to connect the resilient damping element to the steering wheel mounting plate, wherein the resilient damping element has one end that engages the structure that supports the housing of the driver's airbag module substantially without play and in a non-displaceable manner, and an opposite end that engages the vibration absorber unit, the resilient damping element isolating the steering wheel mounting plate from the structure that supports the housing of the driver's airbag module so that the driver's airbag module can vibrate relative to the steering wheel mounting plate and the steering wheel main part.

2. The airbag module assembly according to claim 1, wherein first horn contact and second horn contact, the first and second horn contacts being movable relative to each other between a home position in which the horn contacts are spaced apart from each other and an actuating position in which the horn contacts contact each other to trigger a horn signal.

3. The airbag module assembly according to claim 1, wherein the connector additionally extends through and secures an airbag retaining element disposed in the module housing so that the airbag is clamped between the airbag retaining element and the housing bottom by the screw connection.

4. The airbag module assembly according to claim 1, wherein the module housing further comprises a housing cap and wherein, for actuating a vehicle horn, the housing cap and the housing bottom are movable relative to each other to a limited extent between a home position in which a first horn contact and a second horn contact are spaced apart from each other and an actuating position in which the two horn contacts contact each other.

5. The airbag module assembly according to claim 1, wherein the vibration absorber unit comprises a module mounting plate which extends substantially in parallel to the steering wheel mounting plate and through which the connector extends so that the module mounting plate is connected to the steering wheel mounting plate, wherein the resilient damping element supports the housing, via the module mounting plate, on the steering wheel mounting plate so that the driver's airbag module can vibrate relative to the steering wheel mounting plate and the steering wheel main part.

6. The airbag module assembly according to claim 5, wherein, for actuating a vehicle horn, the module housing and the module mounting plate are movable relative to each other to a limited extent between a home position in which a first horn contact and a second horn contact are spaced apart from each other and an actuating position in which the two horn contacts contact each other.

7. The airbag module assembly according to claim 5, wherein the vibration absorber unit comprises an intermediate plate which extends substantially in parallel to the steering wheel mounting plate as well as between the module mounting plate and the steering wheel mounting plate, wherein the module mounting plate is screw-connected, by means of a first screw, to the driver's airbag module substantially without play and in a non-displaceable manner and, by means of the connector, to the intermediate plate so that the resilient damping element supports the housing, via the intermediate plate and the module mounting plate, on the steering wheel mounting plate so that the driver's airbag module can vibrate relative to the steering wheel mounting plate and the steering wheel main part.

8. The airbag module assembly according to claim 7, wherein, for actuating a vehicle horn, the module mounting plate and the intermediate plate are movable relative to each other to a limited extent between a home position in which a first horn contact and a second horn contact are spaced apart from each other and an actuating position in which the two horn contacts contact each other.

9. The vehicle steering wheel according to claim 8, wherein the first horn contact is coupled to the intermediate plate and the second horn contact is coupled to the module mounting plate.

10. A vehicle steering wheel comprising a steering wheel main part and an airbag module assembly according to claim 1, wherein the steering wheel mounting plate of the vibration absorber unit is fastened on the steering wheel main part substantially without play and in a non-displaceable manner.

11. The vehicle steering wheel according to claim 10, wherein the steering wheel mounting plate forms a latching connection with the steering wheel main part.

12. A method for production and quality testing of an airbag module assembly according to claim 1, comprising the steps of:
 a) producing the airbag module assembly with vibration absorbing function by connecting the driver's airbag module to the vibration absorber unit via the connector; and subsequently
 b) testing a vibration absorbing function by measuring a system reaction after vibration excitation of the steering wheel mounting plate, prior to mounting the airbag module assembly on a steering wheel main part.

13. The method according to claim 12, wherein in step b) at least one further function of the airbag module assembly is tested, wherein the at least one further function comprises a horn function.

14. The airbag module assembly according to claim 1, wherein the connector extends through the bottom wall of the module housing.

15. The airbag module assembly according to claim 1, wherein the connection of the module housing to the steering wheel mounting plate via the vibration absorber unit comprises a screw-connection, a riveted connection, or a welded connection.

16. The airbag module assembly according to claim 1, wherein the resilient damping element is constructed of an elastomer that exhibits a comparatively high degree of damping.

* * * * *